United States Patent

Sutko

[15] 3,690,341
[45] Sept. 12, 1972

[54] EQUAL FLOW DISTRIBUTOR
[72] Inventor: Adolph A. Sutko, Ponca City, Okla.
[73] Assignee: Continental Oil Company, Ponca City, Okla.
[22] Filed: April 21, 1971
[21] Appl. No.: 136,011

[52] U.S. Cl. ............... 137/101, 137/118, 137/612, 137/625.44
[51] Int. Cl. ............................................. G05d 11/00
[58] Field of Search...137/100, 101, 118, 87, 625.44, 137/612

[56] References Cited

UNITED STATES PATENTS

| 893,645 | 7/1908 | Olson | 137/612 X |
| 1,405,900 | 2/1922 | Cassalette | 137/612 |
| 1,905,733 | 4/1933 | Moore | 137/101 |
| 2,440,059 | 4/1948 | Olcott et al. | 137/101 |
| 2,676,602 | 4/1954 | Fox | 137/118 |
| 3,545,470 | 12/1970 | Paton | 137/101 X |

*Primary Examiner*—M. Cary Nelson
*Assistant Examiner*—David J. Zobkiw
*Attorney*—Joseph C. Kotarski, Henry H. Huth, Robert B. Coleman, Jr., William J. Miller and David H. Hill

[57] ABSTRACT

An equal flow distributor is adapted to take the flow from an inlet port and divide it equally between two outlet ports in such a manner that a deviation in pressure at either of the outlet ports will cause rotation of a butterfly valve and torsional spring combination to equal the flow between the outlet ports inspite of the change in pressure between the ports.

3 Claims, 4 Drawing Figures

INVENTOR.
ADOLPH A. SUTKO
BY William J. Miller
ATTORNEY

EQUAL FLOW DISTRIBUTOR

BACKGROUND OF THE INVENTION

The primary object of this invention is to divide an input flow, for example water, into two equal output flows. The invention is particularly adapted to equal flow distribution when the output pressures are unequal. In many instances, for example, water flood operations, it is desirable to apply an equal amount of water into two injection wells; however, due to formation differences, these wells can have radically different pressures. This invention is particularly suited to apply water to the injection wells inspite of the differential pressure between the wells. The invention, of course, will operate in any environment where equal flow is required at two different outlets.

DISCUSSION OF PRIOR ART

Equal flow distributors appear to be of two basic types. The first is illustrated by the patent to H. S. Young, Jr., U.S. Pat. No. 2,353,535, which patent illustrates a distributor designed to shutoff one of two outlets when the flow becomes appreciably unequal at the two outlets. The second type of patent has internal structure which functions to maintain control of the flow to two different outlets, for example, the patent to C. H. Fox, U.S. Pat. No. 2,676,602, and the patent to W. F. Moore, U.S. Pat. No. 1,905,733. The patent to Fox illustrates a manual system for correcting differential pressures and thus flow to separate outlets. The patent to Moore illustrates an equal flow distributor capable of adjusting very small differences in differential pressures at the outlet.

None of the patents, however, show a system suitable for balancing large differential pressures, hence large deviations in flow at a pair of outlets.

Figure 1:
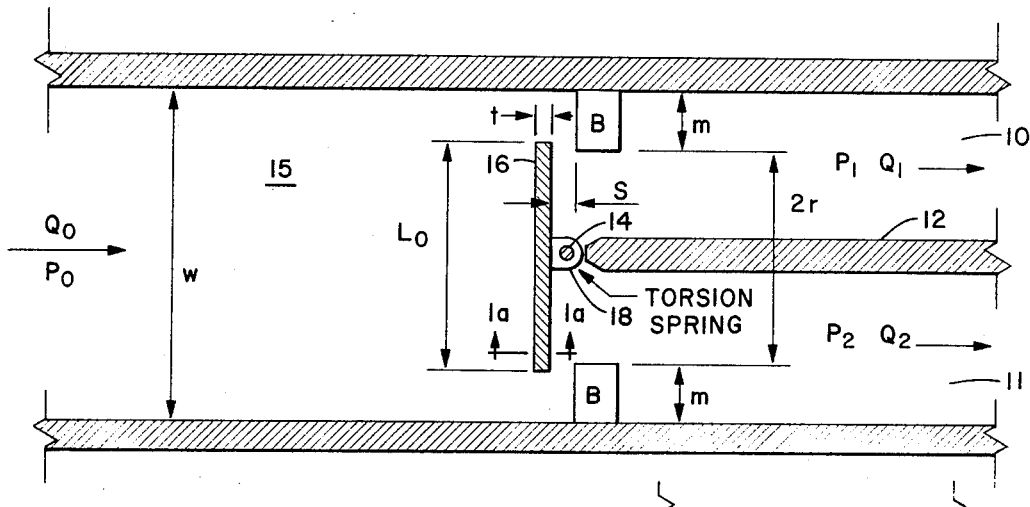
FIG. 1 is a top cross-sectional view of an equal flow distributor in accordance with the teachings of this invention.
Figure 1A:
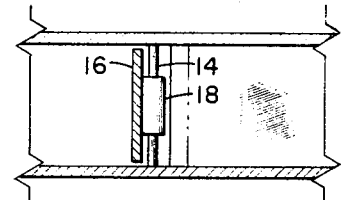
FIG. 1a is a cross-sectional view of the butterfly valve taken through 1a—1a of FIG. 1.

Referring to all of the figures in general, but in particular to FIG. 1, a flow $Q_0$ having a pressure $P_0$ enters the inlet having a width W. A pair of outlets 10 and 11 have flows $Q_1$ and $Q_2$, respectively, and pressures $P_1$ and $P_2$, respectively. Interposed between the inlet and the pair of outlets 10 and 11 is a dividing wall 12 having a torsion spring 14 mounted in line with the wall 12 and attached to the bottom 15 and top (not shown). Attached to the torsion spring 14 by a mounting 18 is a butterfly valve 16 having a length $L_0$. Mounted to the outside walls the full height of the outlet chambers is a barrier B mounted a distance S from the butterfly valve when the pressures and flows from outlets 10 and 11 are equal. Barrier B projects into the flowstream outlets 10 and 11 a distance M.

Figure 2:
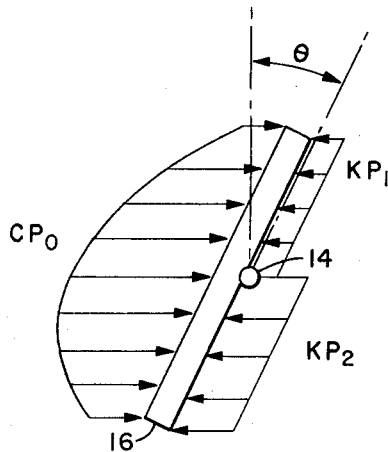
FIG. 2 is a mathematical illustration showing the operation of the forces on the butterfly valve.

Referring to FIG. 2 a pressure distribution diagram for the butterfly valve is shown. It is assumed that the upstream or inlet pressure is symmetrical about its midpoint. A pressure distribution factor K is shown with the pressure acting on the backside of the valve 16 to indicate that these pressures are not actually the same as the pressures $P_1$ and $P_2$, respectively (the downstream pressures). Assuming that the distribution on the downstream side of the butterfly valve is similar, the same factor is used for $P_1$ and $P_2$. The upstream factor is a constant C.

Figure 3:
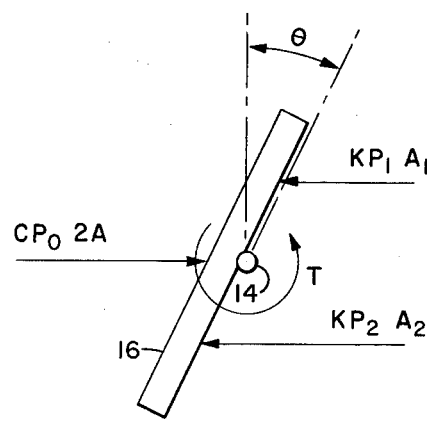
FIG. 3 illustrates the mathematical interpretation of the forces illustrated in FIG. 2.

Referring to FIG. 3, a free body diagram of the butterfly valve 16 is shown. If the area of the face is taken as 2A, moments when they are summed about the center 14 of the valve are as follows:

$$\Sigma M = 0 \qquad T + KP_1 Ar/2 = KP_2 Ar/2 \qquad (1)$$

where $T =$ the spring torque and $r =$ one-half the distance between the barriers or baffels B.

In Equation 1 it is assumed that the angle of rotation is small insofar as it affects the length of the moment arm, $r/2$. Equation 1 can be rewritten $$T = \frac{KAr}{2}(P_2 - P_1) \qquad (2)$$

For a circular shaft undergoing torsion the torque is given by $$T = \theta JG/l \qquad (3)$$

where $\theta =$ the angle through which the valve 16 has been turned, $J =$ the polar moment of inertia, which equal $\pi R^4$ 2

$G =$ the shear modulus of the material from which the torque spring 14 has been constructed, and $l =$ length of shaft undergoing torsion.

Combining equations 2 and 3 and solving for $J/l$ gives:

$$\frac{J}{l} = \frac{KAr}{2\theta G}(P_2 - P_1) \qquad (4)$$

In the above and in future examples it should be understood that:

$$\Delta P_1 = P_0 - P_1 \qquad (5)$$

$$\Delta P_2 = P_0 - P_2 \qquad (6)$$

and when combined gives:

$$P_2 - P_1 = \Delta P_1 - \Delta P_2 \qquad (7)$$

If it is next assumed that the flow rates past the ends of the butterfly valve are equal, then $Q_1$ will equal $Q_2$. This can be written as:

$$(\text{Velocity} \times \text{Area})_1 = (\text{Velocity} \times \text{Area})_2 \qquad (8)$$

Because the flow past the valve is a type of orifice flow, we can assume that the velocity is proportional to the square root of the pressure drop across the orifice. Equation 8 can then be written:

$$C_1 \sqrt{\Delta P_1} \, \text{Area}_1 = C_2 \sqrt{\Delta P_2} \, \text{Area}_2 \qquad (9)$$

$\text{Area}_1$ and $\text{Area}_2$ can be written as $s \mp r\theta$ (assuming unit depth in direction perpendicular to the drawing).

Since the orifice geometries are similar, then $$C_1 \cong C_2$$

and therefore $$\Delta P_2 = \Delta P_1 (s - r\theta/s + r\theta) \qquad (10)$$

Combining equations 4, 7, and 10 and simplifying $$GJ/l = 2KAr^2 s P_1/(s+r\theta)^2 \qquad (11)$$

Equation 10 describes the properties necessary in the torsion spring 14 as a function of the system pressures and the geometry of the distributor. If a particular material is chosen for the torsion spring 14, and using a circular rod, the equation can be written:

$$\frac{GR^4}{1} = \frac{4KAr^2 s \Delta P_1}{\pi(s+r\theta)^2}$$

Using the above equations a distributor can be designed as follows:

a. Determine the maximum value desired for $\Delta P_1$ or $\Delta P_2$.

b. Decide on the maximum value for $\theta$ (To keep within the assumption that $\theta$ is small the maximum value should probably be 0.4 radian or less.)

c. Values for $A$, $r$, and $s$ should then be chosen. (After $\theta$ is picked r and s are restricted to a certain range since $r\theta_{max} = s$)

d. A value is then assumed for $k$.

A suitable combination of $r$ and $l$ can then be selected which satisfies Equation 11.

While the above description has been for a rectangular cross-section device, similar calculations could be made for a circular cross-section device. Also various types of torsion springs can be selected.

It should also be understood that the maximum absolute pressure under which the device will function must be limited by the material strength of its components. Limits for the relative differential pressures $\Delta P_1$ and $\Delta P_2$ for any given design should be determined. Of course, flow rate limits will depend upon the size of the outlets, the inlet, and other distributor geometry.

I claim:

1. An equal flow distributor comprising:

a. an outside shell having an inlet and a partition forming first and second outlets, said partition mounted axially along the inside of said shell and terminating part way through said shell, b. a torsion spring, c. a butterfly valve rotatably mounted normal to the axis at the terminus of said partition by attaching said torsion spring between said butterfly valve midpoint and the terminus of said partition, d. restriction barriers mounted on the inner wall of said shell between the terminus of said partition and said first and second outlet means.

2. A device as described in claim 1 wherein said torsion spring has characteristics as defined in the formula $$\frac{GR^4}{1} = \frac{4KAr^2 s \Delta P_1}{\pi(s+r\theta)^2}$$

where $G$ equals the shear modulus of the material from which the torque spring has been constructed, $R$ is the radius of the spring, $l$ equals the length of said torsion spring undergoing torsion, $K$ is a constant, $A$ equals area of the butterfly valve being subjected to a particular pressure, $\theta$ is the angle through which the said valve has been turned, $s$ is the distance between the restriction barriers and the butterfly valve when the butterfly valve is in the $\theta = 0$ position $\Delta P_1$ is the pressure at said first outlet, and $r$ equals one-half the distance between said barriers.

3. A device as described in claim 1 wherein said torsion spring has a circular cross-section.

* * * * *